United States Patent [19]

McKown

[11] Patent Number: 4,662,901

[45] Date of Patent: May 5, 1987

[54] RECOVERY OF DIBUTYLTIN DIFLUORIDE FROM A HOT, WASTE GAS STREAM

[75] Inventor: Clem S. McKown, Lake Hopatcong, N.J.

[73] Assignee: M&T Chemicals Inc., Woodbridge, N.J.

[21] Appl. No.: 802,794

[22] Filed: Nov. 27, 1985

[51] Int. Cl.$^4$ ............................................. B01D 47/00
[52] U.S. Cl. .......................................... 55/90; 71/72; 71/97; 556/81
[58] Field of Search .................. 55/71, 72, 84, 90, 97; 556/81

[56] References Cited

U.S. PATENT DOCUMENTS

| | | | |
|---|---|---|---|
| 3,677,814 | 7/1972 | Gillery | 117/211 |
| 3,697,567 | 10/1972 | Taylor | 260/437 R |
| 3,931,264 | 1/1976 | Larkin et al. | 260/429.7 |
| 4,036,866 | 7/1977 | Larkin et al. | 260/429.7 |
| 4,038,301 | 7/1977 | Otto | 260/437 R |
| 4,182,783 | 1/1980 | Henery | 427/248 B |
| 4,191,698 | 3/1980 | Gitlitz | 260/429.7 |
| 4,254,046 | 3/1981 | Franz | 260/429.7 |
| 4,273,747 | 6/1981 | Rasmussen | 55/72 |
| 4,322,363 | 3/1982 | Wagner | 260/429.7 |
| 4,325,988 | 4/1982 | Wagner | 427/160 |
| 4,344,986 | 8/1982 | Henery | 427/180 |
| 4,359,493 | 11/1982 | Henery | 427/255.1 |
| 4,401,695 | 8/1983 | Sopko | 427/180 |

*Primary Examiner*—Bernard Nozick
*Attorney, Agent, or Firm*—S. Parker; J. Matalon; R. Bright

[57] ABSTRACT

A method of converting at least partially molten dibutyltin difluoride contained in a hot, waste gas stream into substantially dry, solid particles suitable for recovery by filtration through a porous bag filter. The method includes the steps of introducing a predetermined amount of liquid water into the stream, and vaporizing the liquid water to cool the gas and the molten dibutyltin difluoride to form substantially dry particles. The amount of liquid water is sufficient to effect the desired cooling without saturating the gas stream.

8 Claims, No Drawings

RECOVERY OF DIBUTYLTIN DIFLUORIDE FROM A HOT, WASTE GAS STREAM

BACKGROUND OF THE INVENTION

1. Field of the Invention

This invention relates to a method of recovering dibutyltin difluoride from a hot, waste gas stream, and, more particularly, to a method of recovering dibutyltin difluoride as dry, solid particles.

2. Description of the Prior Art

Dibutyltin difluoride has been used extensively for making conductive tin oxide coatings by the powder deposition method. In this method, dibutyltin difluoride is reduced to a very fine particle size, which is then dispersed into a carrier gas stream, such as air. The stream then is delivered to a hot substrate, such as glass, and the desired tin oxide coating is formed thereon by decomposition of the dibutyltin difluoride. The powder deposition method is described in detail in U.S. Pat. Nos. 3,677,814; 4,182,783; 4,325,988; 4,344,986; 4,359,493; and 4,401,695.

Only a fraction of the dibutyltin difluoride actually is reacted with carrier and at the hot glass surface to form the conductive tin oxide coating; the rest, or unreacted dibutyltin difluoride, is removed by ambient air. This hot, waste gas stream contains spent dibutyltin difluoride which must be recovered. In practice however, commercial recovery of unreacted dibutyltin difluoride from the hot, waste gas stream is complicated by the fact that dibutyltin difluoride may be present in at least a partially molten state in the hot gas. Thus, when the gas stream is filtered through a fine porous filter bag, the molten dibutyltin difluoride tends to plug up the pores of the bag, making recovery very difficult. In an attempt to solve this problem, cool air has been introduced into the gas stream. However, this technique is disadvantageous because it dilutes the stream and thus it necessitates substantially larger filtration equipment to accommodate the increased volume of gas.

Accordingly, an object of this invention is to provide a method of recovering dibutyltin difluoride from a hot, waste gas stream.

Another object herein is to provide a method of recovering unreacted dibutyltin difluoride as substantially dry, solid particles.

A further object herein is to convert molten or partially molten dibutyltin difluoride, present in a waste gas stream, into substantially dry particles which can be readily recovered by filtration through a porous filter bag.

These and other objects and features of the invention are accomplished herein in a novel and commercially advantageous method, which is described in detail in the following description.

SUMMARY AND DESCRIPTION OF THE INVENTION

There is provided herein a method of recovering dibutyltin difluoride as substantially dry, solid particles from a hot, waste gas stream containing the compound in the state of molten or partially molten material. The method of the invention includes the steps of introducing liquid water into the hot, gas stream, and then vaporizing the liquid water, thereby to cool the gas and molten dibutyltin difluoride to form substantially dry, solid particles. These particles of dibutyltin difluoride then can be readily recovered by filtration, for example, through a porous bag filter.

Typically, the molten or partially molten dibutyltin difluoride is present in the waste air stream which is maintained at a temperature of about 220° to 550° F., usually about 350° F., by the process of the invention the temperature is reduced to about 150° to 200° F., usually about 175° F.

The liquid water is introduced at a temperature, which usually ranges from below ambient temperature to ambient temperature, and in a sufficient amount to effect the desired cooling without saturating the air. suitably, about 0.04 to 0.8 gallons of liquid water is used per 1000 standard cubic feet of exhaust air. The relative humidity of the air generally is less than 70%, and preferably less than 50% after the addition of water.

In a typical run, the hot, waste air stream from the powder deposition operation produces unreacted molten or at least partially molten dibutyltin difluoride in hot air having a temperature of about 350° F. Then liquid water at ambient temperature, e.g. about 70° F., is injected into the stream through suitable spray nozzles in an amount sufficient to reduce the temperature of the air to about 175° F. Preferably about 0.35 gallons of liquid water is used per 1000 standard cubic feet of exhaust air. After the desired cooling is effected the air stream; containing dry, solid particles of dibutyltin difluorides, which are recovered by filtration through a porous bag filter.

While the invention has been described with particular reference to certain embodiments thereof, it will be understood that changes and modifications may be made which are within the skill of the art. It is intended to be bound only by the accompanying claims.

What is claimed is:

1. A method of converting at least partially molten dibutyltin difluoride contained in a hot, waste gas stream into substantially dry, solid particles suitable for recovery by filtration through a porous bag filter comprising:
   introducing a predetermined amount of liquid water into said stream, and
   vaporizing the liquid water to cool the gas and the molten dibutyltin difluoride to form substantially dry particles thereof, the amount of said liquid water being sufficient to effect the desired cooling without saturating the gas stream.

2. A method according to claim 1 wherein the gas stream is air.

3. A method according to claim 1 which includes the additional step of:
   recovering the substantially dry dibutyltin difluoride particles from the gas stream.

4. A method according to claim 3 wherein recovery is accomplished by filtering the particles through a porous filter bag.

5. A method according to claim 1 wherein the temperature of the hot, waste gas stream is about 220° to 550° F., and said cooling is effective to reduce its temperature to about 150° to 200° F.

6. A method according to claim 1 wherein said predetermined amount of liquid water which is introduced into the gas stream is about 0.04 to 0.8 gallons of water per 1000 standard cubic feet of the gas stream.

7. A method according to claim 1 wherein the liquid water is introduced by spraying.

8. A method according to claim 1 wherein the relative humidity of the hot, waste gas stream after introduction of liquid water is less than 70%.

* * * * *